United States Patent
Akl et al.

(10) Patent No.: US 12,526,687 B2
(45) Date of Patent: Jan. 13, 2026

(54) MULTIPLE ACCESS POINT (AP) ASSOCIATION

(71) Applicant: QUALCOMM Incorporated, San Diego, CA (US)

(72) Inventors: Naeem Akl, Bridgewater, NJ (US); Karl Georg Hampel, Jersey City, NJ (US)

(73) Assignee: QUALCOMM Incorporated, San Diego, CA (US)

(*) Notice: Subject to any disclaimer, the term of this patent is extended or adjusted under 35 U.S.C. 154(b) by 367 days.

(21) Appl. No.: 18/339,958

(22) Filed: Jun. 22, 2023

(65) Prior Publication Data

US 2024/0430739 A1 Dec. 26, 2024

(51) Int. Cl.
*H04W 28/02* (2009.01)
*H04W 76/12* (2018.01)

(52) U.S. Cl.
CPC ....... *H04W 28/0273* (2013.01); *H04W 76/12* (2018.02)

(58) Field of Classification Search
None
See application file for complete search history.

(56) References Cited

U.S. PATENT DOCUMENTS

2025/0184285 A1* 6/2025 Schliwa-Bertling .... H04L 47/80

OTHER PUBLICATIONS

3GPP TS 29.281 V17.4.0 , 3rd Generation Partnership Project; Technical Specification Group Core Network and Terminals; General Packet Radio System (GPRS) Tunnelling Protocol User Plane (GTPv1-U) (Release 17), p. 1-35 (Year: 2022).*
3GPP TS 29.281 V17.1.0 , 3rd Generation Partnership Project; Technical Specification Group Core Network and Terminals; General Packet Radio System (GPRS) Tunnelling Protocol User Plane (GTPv1-U) (Release 17), p. 1-34 (Year: 2021).*

* cited by examiner

*Primary Examiner* — Kouroush Mohebbi
(74) *Attorney, Agent, or Firm* — ArentFox Schiff LLP

(57) ABSTRACT

Aspects of the disclosure are directed to a lower layer split for a radio access network (RAN) node. In some examples, the number of tiers for the user plane path may be reduced from three to two, which may include redistribution of functionality of a central unit user plane (CU-UP) between two network entities. In some examples, a first network entity of the two network entities may be configured to receive, from a second network entity of the two network entities, a first user plane protocol data unit (UP-PDU) associated with a user plane (UP) protocol session. In some examples, the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE).

30 Claims, 13 Drawing Sheets

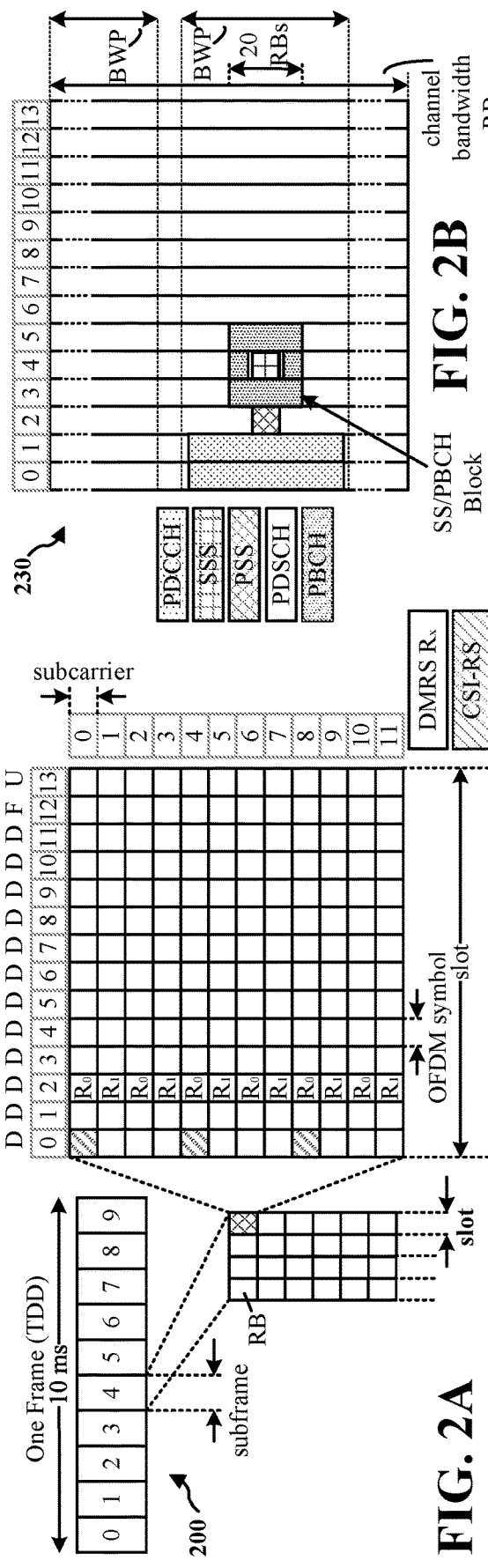
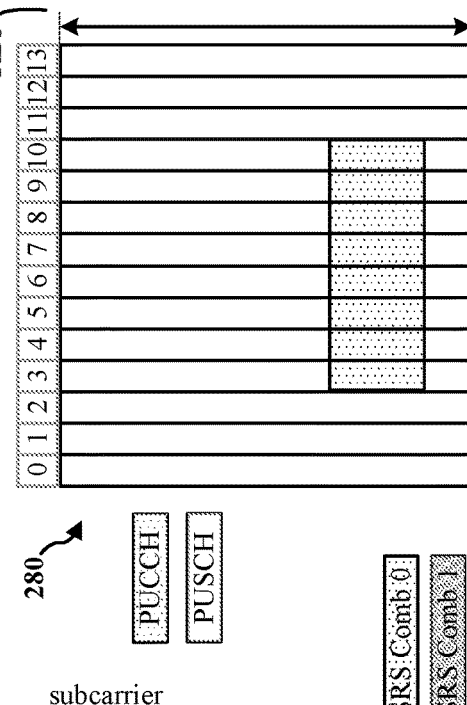
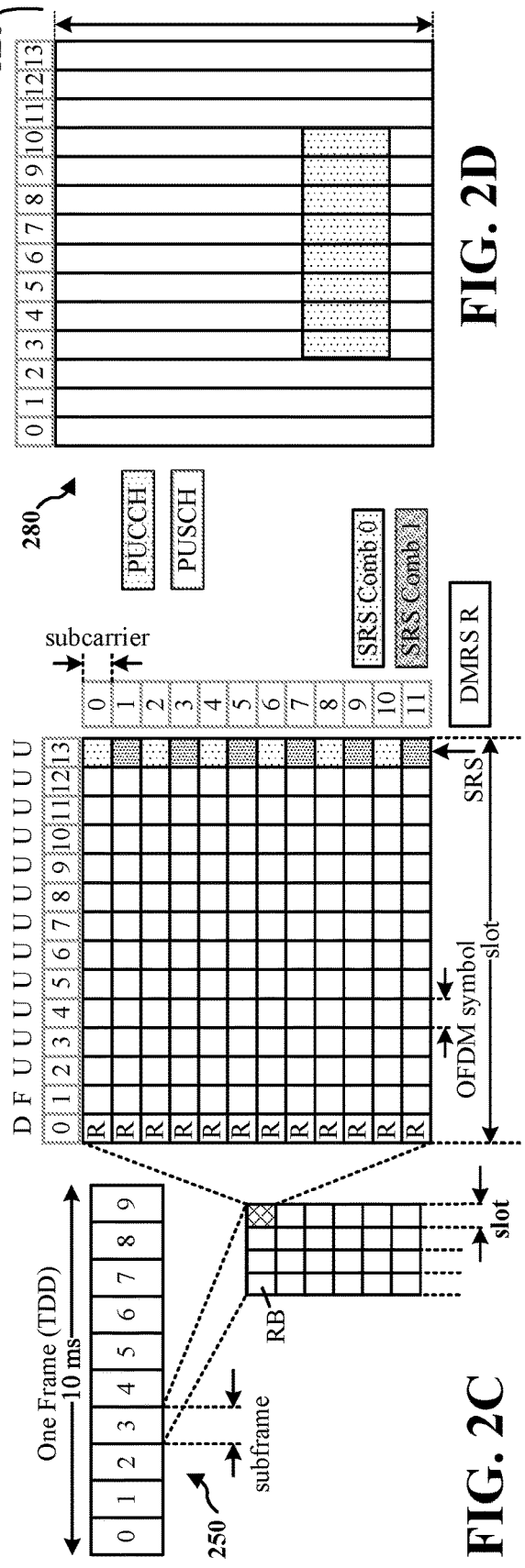
FIG. 2A
FIG. 2B
FIG. 2C
FIG. 2D

1000

Receiving, from a second network entity, a first user plane protocol data unit (UP-PDU) associated with the UP-protocol session, the first UP-PDU being one of a first flow of UP-PDUs associated with a first type of quality of service (QoS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE) ~1002

Transmitting, to the second network entity within the UP-protocol session, a control message configured to indicate a status of transmission of the first data to the UE, wherein the control message comprises an indication of the second identifier ~1004

```
┌─────────────────────────────────────────────────┐
│ Transmitting, to a second network entity, a first user plane
│ protocol data unit (UP-PDU) associated with the UP-protocol
│ session, the first UP-PDU being one of a first flow of UP-PDUs
│ associated with a first type of quality of service (QoS), wherein
│ the first UP-PDU is received via a tunnel established between the
│ first network entity and the second network entity, and wherein      ~1302
│ the first UP-PDU includes a first identifier configured to identify
│ the tunnel, a second identifier configured to identify the first flow
│ of UP-PDUs, a third identifier configured to identify the first UP-
│      PDU within the first flow of UP-PDUs, and a first data for
│                 transmission to a user equipment (UE)
└─────────────────────────────────────────────────┘
                          │
                          ▼
┌─────────────────────────────────────────────────┐
│   Receiving, from the second network entity within the UP-
│     protocol session, a control message configured to indicate a    ~1304
│     status of transmission of the first data to the UE, wherein the
│  control message comprises an indication of the second identifier
└─────────────────────────────────────────────────┘
```

FIG. 13

MULTIPLE ACCESS POINT (AP) ASSOCIATION

BACKGROUND

Technical Field

The present disclosure generally relates to communication systems, and more particularly, to association between a wireless device and multiple access points (APs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. In an aspect of the disclosure, a method, a computer-readable medium, and an apparatus are provided.

In certain aspects, a first network entity configured for wireless communication and hosting a user plane (UP) protocol session includes one or more memories, individually or in combination, having instructions, and one or more processors, individually or in combination, configured to execute the instructions. In some examples, the one or more processors are configured to receive, from a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE). In some examples, the one or more processors are configured to transmit, to the second network entity within the UP-protocol session, a control message configured to indicate a status of transmission of the first data to the UE, wherein the control message comprises an indication of the second identifier.

In certain aspects, a first network entity configured for wireless communication and hosting a user plane (UP) protocol session includes one or more memories, individually or in combination, having instructions, and one or more processors, individually or in combination, configured to execute the instructions. In some examples, the one or more processors are configured to transmit, to a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE). In some examples, the one or more processors are configured to receive, from the second network entity within the UP-protocol session, a control message configured to indicate a status of transmission of the first data to the UE, wherein the control message comprises an indication of the second identifier.

Certain aspects are directed to a method of wireless communication at a first network entity hosting a user plane (UP) protocol session. In some examples, the method includes receiving, from a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE). In some examples, the method includes transmitting, to the second network entity within the UP-protocol session, a control message configured to indicate a status of transmission of the first data to the UE, wherein the control message comprises an indication of the second identifier.

Certain aspects are directed to a method of wireless communication at a first network entity hosting a user plane (UP) protocol session. In some examples, the method includes transmitting, to a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE).

In some examples, the method includes receiving, from the second network entity within the UP-protocol session, a control message configured to indicate a status of transmission of the first data to the UE, wherein the control message comprises an indication of the second identifier.

Certain aspects are directed to a first network entity hosting a user plane (UP) protocol session. In some examples, the first network entity includes means for receiving, from a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE). In some examples, the first network entity includes means for transmitting, to the second network entity within the UP-protocol session, a control message configured to indicate a status of transmission of the first data to the UE, wherein the control message comprises an indication of the second identifier.

Certain aspects are directed to a method of wireless communication at a first network entity hosting a user plane (UP) protocol session. In some examples, the first network entity includes means for transmitting, to a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE). In some examples, the first network entity includes means for receiving, from the second network entity within the UP-protocol session, a control message configured to indicate a status of transmission of the first data to the UE, wherein the control message comprises an indication of the second identifier.

Certain aspects are directed to a non-transitory computer-readable medium having instructions stored thereon that, when executed by a first network entity, cause the first network entity to perform operations. In some examples, the operations include receiving, from a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE). In some examples, the operations include transmitting, to the second network entity within the UP-protocol session, a control message configured to indicate a status of transmission of the first data to the UE, wherein the control message comprises an indication of the second identifier.

Certain aspects are directed to a non-transitory computer-readable medium having instructions stored thereon that, when executed by a first network entity, cause the first network entity to perform operations. In some examples, the operations include transmitting, to a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE). In some examples, the operations include receiving, from the second network entity within the UP-protocol session, a control message configured to indicate a status of transmission of the first data to the UE, wherein the control message comprises an indication of the second identifier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 10 is a flowchart of an example of a method of wireless communication at a first network entity hosting a user plane (UP) protocol session.

FIG. 13 is a flowchart of an example of a method of wireless communication at a first network entity hosting a user plane (UP) protocol session

DETAILED DESCRIPTION

Figure 1:
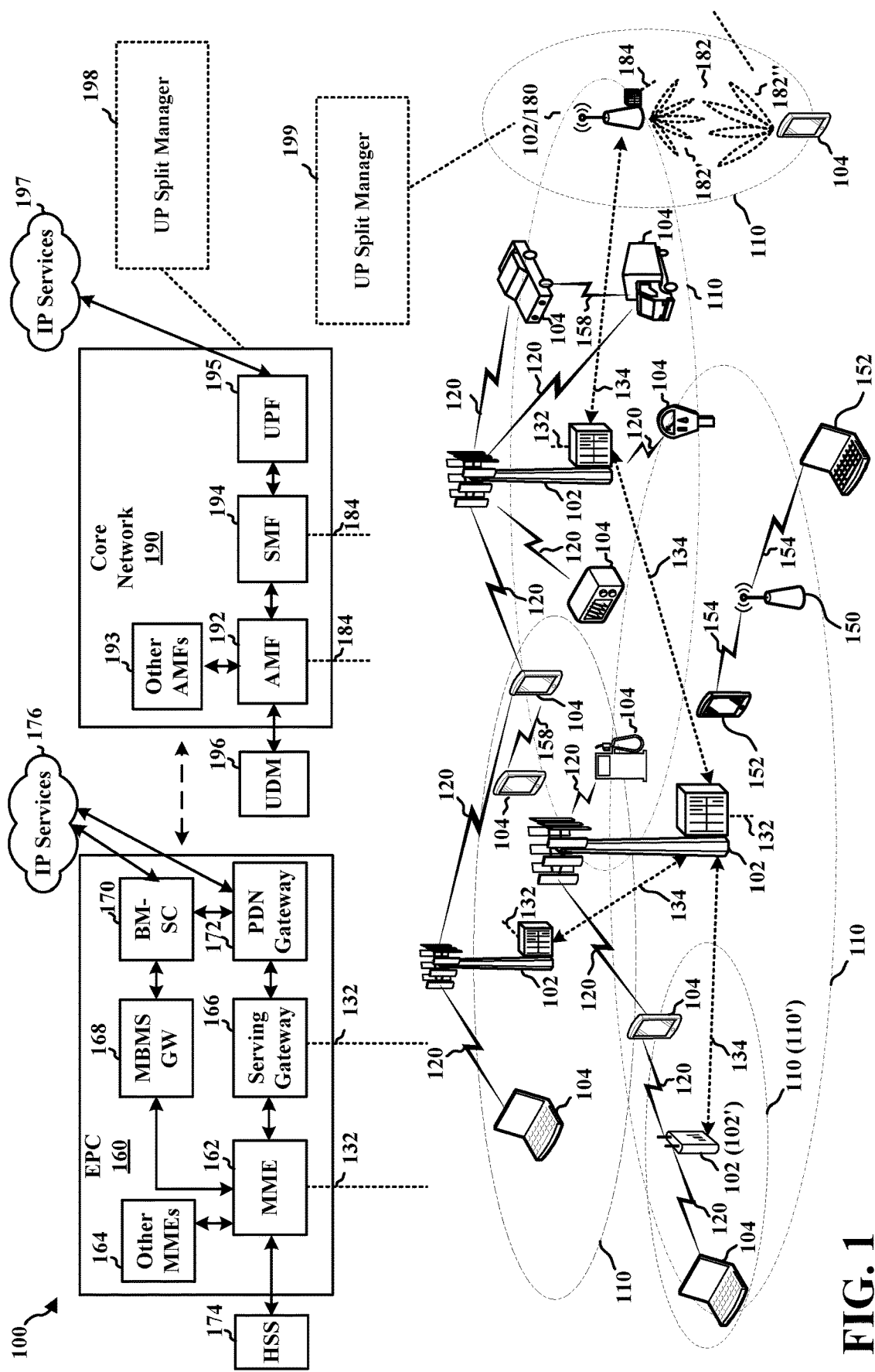
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the disclosure are directed to a lower layer split for a radio access network (RAN) node. In some examples, the number of tiers for the user plane path may be reduced from three to two, which may include redistribution of functionality of a central unit user plane (CU-UP) between two network entities. For example, a conventional user plane path may include a first tier (e.g., user plane function (UPF)), a second tier (e.g., central unit (CU)), and a third tier (e.g., distributed unit (DU)). If the second tier is removed, its functionality may be distributed between first tier and third tier entities.

In some examples, a first-tier entity may typically transmit data to a second-tier entity using quality of service (QOS) flows. However, without the second-tier entity, the QoS flows may need to be mapped to a data radio bearer (DRB) or a general packet radio service (GPRS) tunneling protocol (GTP) in order for the third-tier entity to coherently receive the transmitted data.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A wireless node may comprise a UE, a base station, or a network entity of the base station.

Referring again to FIG. 1, an entity of the CN 190 (e.g., UPF 195 or any other suitable entity) may include a first user plane (UP) split manager 198. As described in more detail elsewhere herein, the first UP split manager 198 may be configured to transmit, to a second network entity (e.g., a RAN node), a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE). The first UP split manager 198 may be further configured to receive, from the second network entity within the UP-protocol session, a control message configured to indicate a status of transmission of the first data to the UE, wherein the control message comprises an indication of the second identifier. Additionally, or alternatively, the first UP split manager 198 may perform one or more other operations described herein.

The base station 102/180 may include a second UP split manager 199. As described in more detail elsewhere herein, the second UP split manager 199 may be configured to receive, from a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE). In some examples, the second UP split manager 199 may be further configured to transmit, to the second network entity within the UP-protocol session, a control message configured to indicate a status of transmission of the first data to the UE, wherein the control message comprises an indication of the second identifier. Additionally, or alternatively, the second UP split manager 199 may perform one or more other operations described herein.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 24 slots/subframe. The subcarrier spacing and symbol length/duration are a function of the numerology. The subcarrier spacing may be equal to $2^{\mu}*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
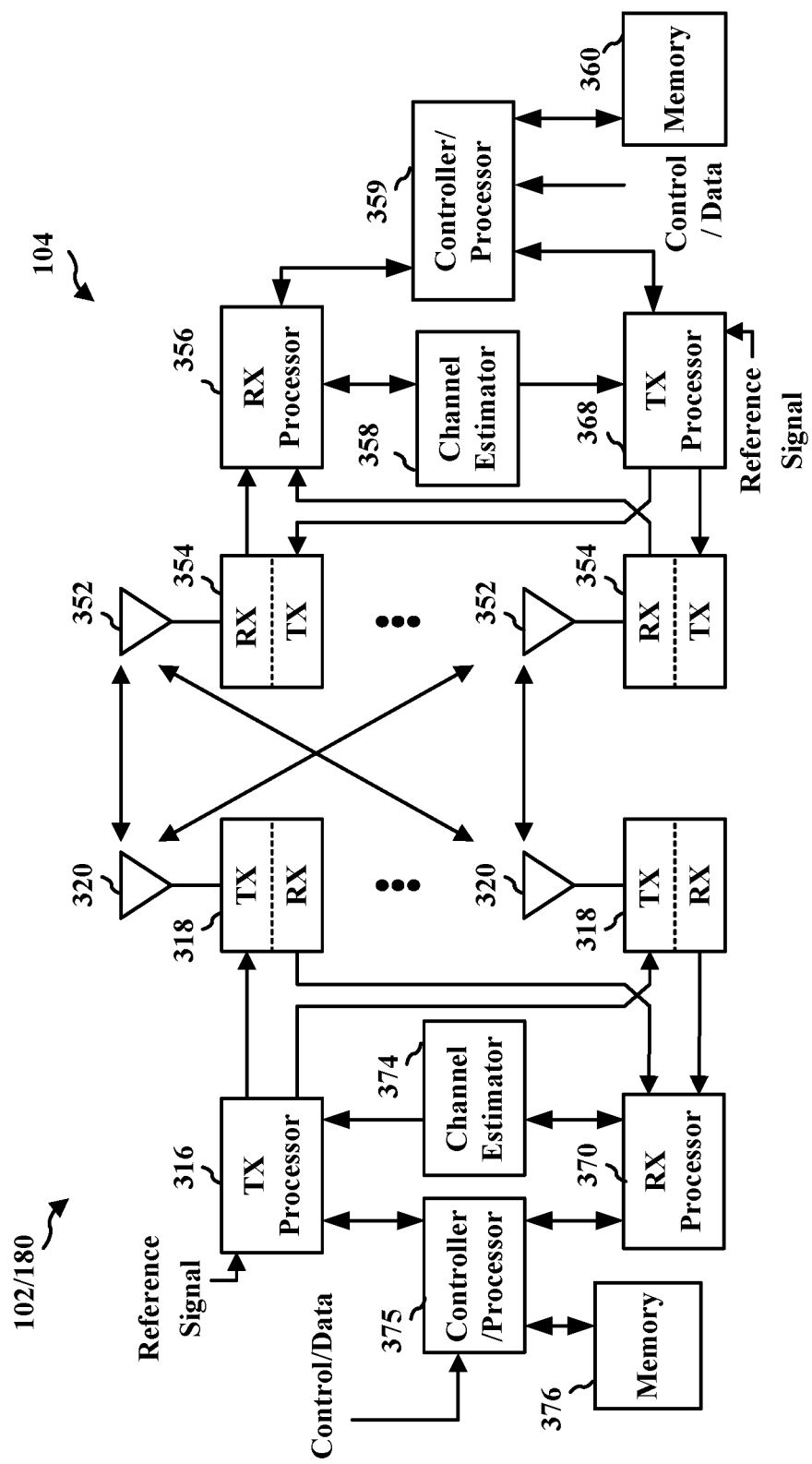
FIG. 3 is a diagram illustrating an example of a base station and user equipment (UE) in an access network.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions, Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102/180, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

Figure 4:
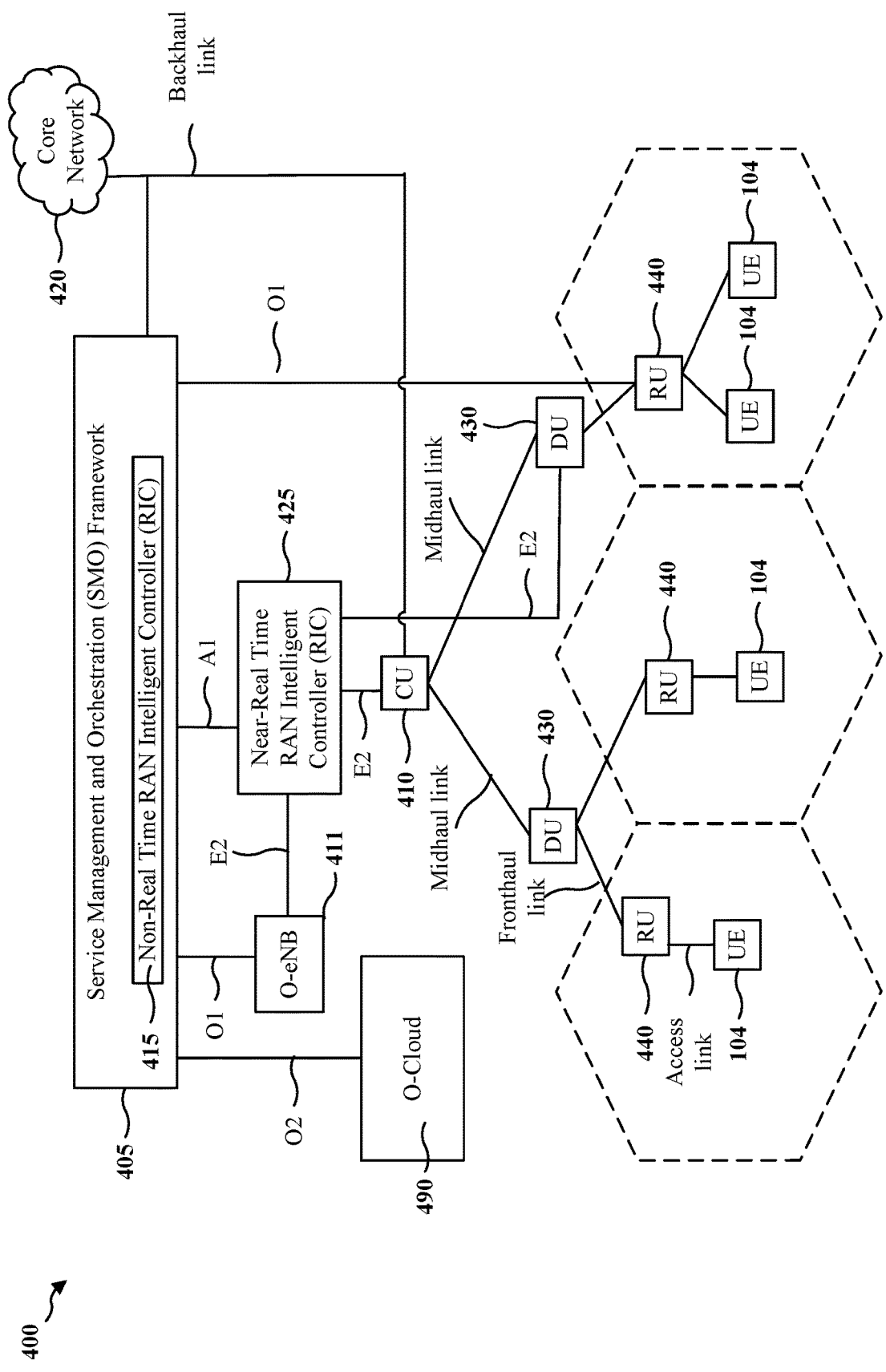
FIG. 4 is a block diagram illustrating an example disaggregated base station architecture.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440. As used herein, a network entity may correspond to a base station or to a disaggregated aspect (e.g., CU/DU/RU, etc.) of the base station.

Each of the units, i.e., the CUS 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-CNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an A1 interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

Example of User Plane Protocol

In a network, the user plane may sometimes be referred to as a data plane, forwarding plane, carrier plane, data path or bearer plane. It refers to processes that are responsible for forwarding packets (e.g., protocol data units (PDUs)) from one interface to another (e.g., source to destination) based on control plane logic. In other words, user plane traffic may be communicated between two network entities and a control plane mechanism is configured to regulate how this communication occurs between the two entities. For example, a first network entity may transmit user plane data to a second network entity, and the second network entity may forward the user plane data to a UE. The second network entity may then transmit control plane information to the first network entity informing it whether the user plane data was successful delivered to the UE (e.g., successful delivery or transmission, whether the user plane data delivery/transmission was in sequence or out of sequence, whether the first network entity is transmitting the second network entity too much data, etc.). In some examples, the control plane information may be communicated in parallel with communication of the user plane data. In such an example, the first network entity may transmit the user plane data to the second network entity with a header configured to convey control information associated with the user plane data (e.g., control information associated with the PDU being communicated via the user plane).

Figure 5:
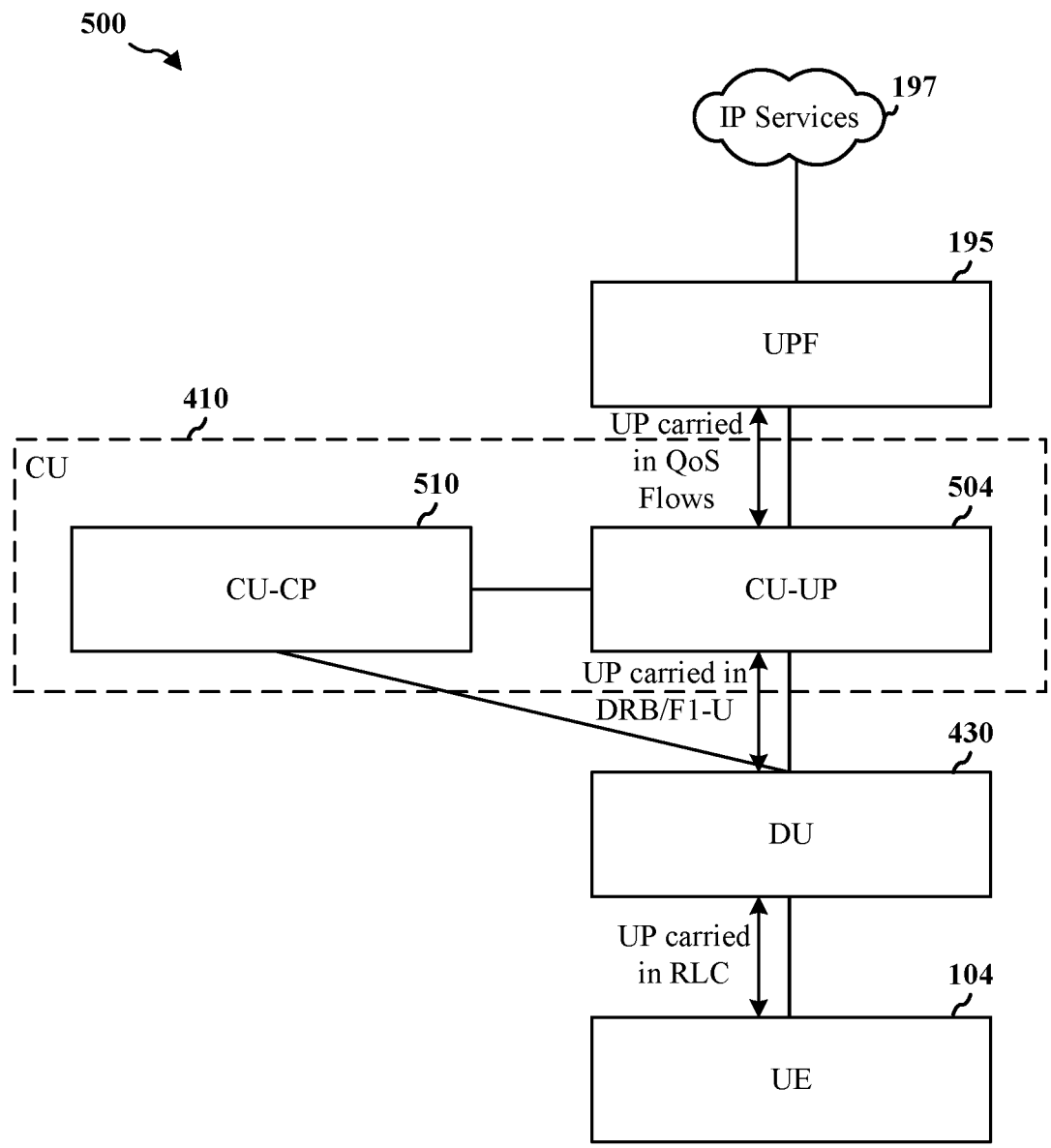
FIG. 5 is a block diagram illustrating an example user plane flow.

FIG. 5 is a block diagram illustrating an example user plane flow 500. Here a UPF 195 (e.g., UPF 195 of FIG. 1) may receive data transmissions from the IP services 197 (e.g., data network server, Internet, etc.) and the UPF 195 may transmit the received data to a CU 410. As discussed, the CU 410 may handle user plane functionality (e.g., CU-UP 504)) and control plane functionality (e.g., central unit-control plane (CU-CP 510)). The CU-UP unit can communicate bidirectionally with the CU-CP unit via an interface, such as the E1 interface. The CU 410 and the DU 430 may be configured to communicate network control and data signaling via data radio bearer (DRB) using an Xn, X2, or F1 (e.g., F1-U) interface. The DU 430 and the UE 104 may communicate via an air interface using a radio link control (RLC) channel.

User plane communications between the UPF 195 and the CU-UP 504 may be carried by a QoS flow. Here, each flow of packets between the UPF 195 and the CU-UP 504 has an associated QoS requirement because each flow may correspond to a different service. For example, a first flow could be associated with an application requiring "best effort," while a second flow could be "time critical," and a third flow could be associated with an application requiring relatively less reliability.

User plane communications between the CU-UP 504 and the DU 430 may be made via DRBs using the F1-U interface. Here, the CU-UP 504 may map a QoS flow to a DRB, and the DRB may be mapped to a general packet radio service (GPRS) tunneling protocol user plane (GTP-U) tunnel of F1-U. In some examples, multiple QoS flows may be mapped to the same DRB. User plane communications between the DU 430 and the UE 104 may be transmitted via an RLC channel. Here, the DU 430 may map the DRB to an RLC, and may identify the corresponding DRB of a user plane data transmission to the UE 104 via a MAC header comprising a logical channel ID.

Figure 6:
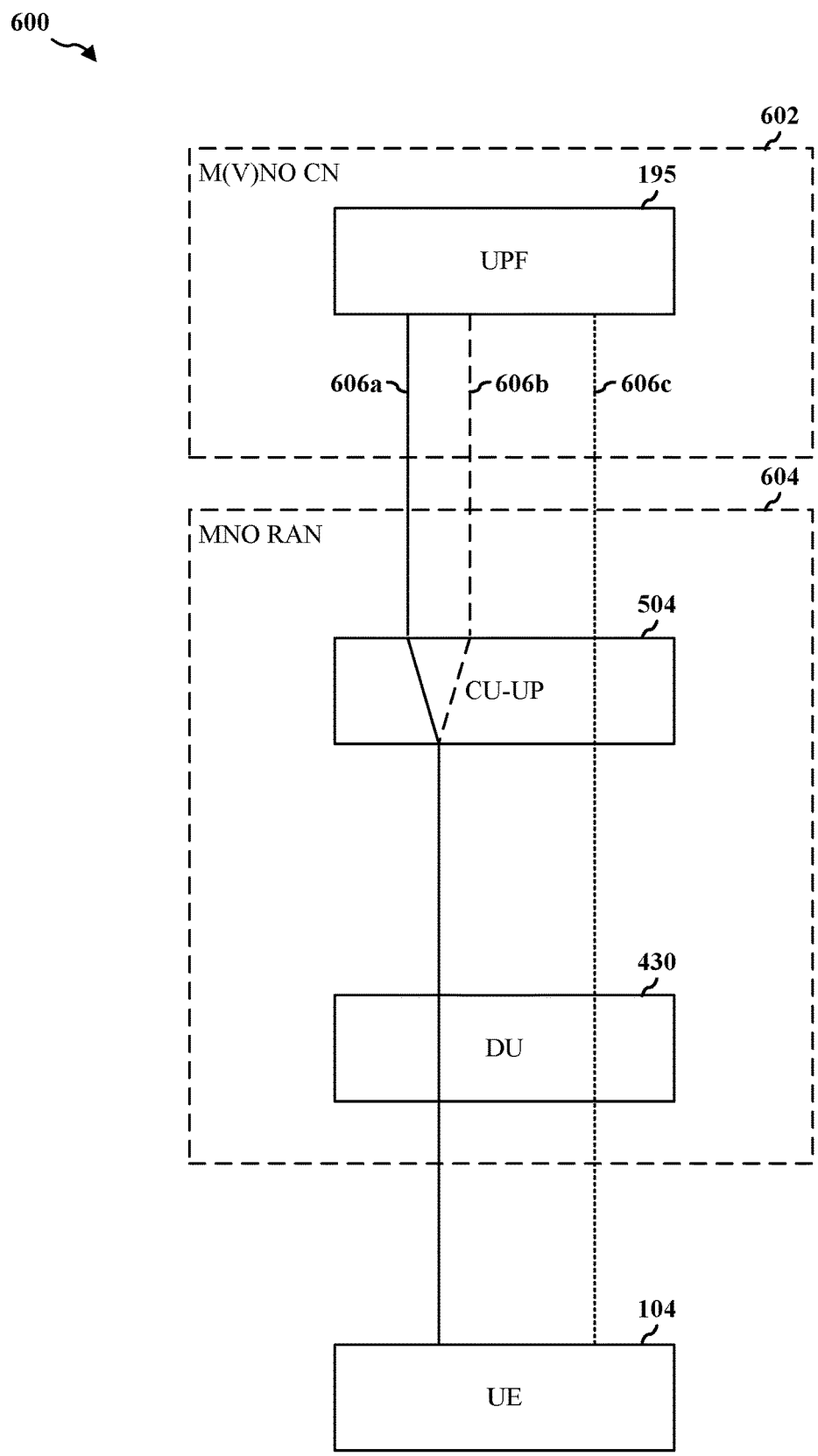
FIG. 6 is a block diagram illustrating an example of multiple user plane protocol instances.

FIG. 6 is a block diagram illustrating an example of multiple user plane protocol instances 600. The UPF 195 may form part of a core network (CN) 602 managed by a mobile network operator (MNO) or a mobile virtual network operator (MVNO). The CN 602 may configure QoS flows (e.g., a first QoS flow 606a, a second QoS flow 606b, and a third QoS flow 606c (collectively QoS flows 606)) at the UPF 195 according to different QoS requirements associated with each QoS flow. For example, the third QoS flow 606c may require higher reliability relative to the other QoS flows.

It is up to the MNO RAN 604 whether to map one or more QoS flows to the same or different DRBs to be carried in the same or different F1-U interfaces. Here, the CU-UP 504 may map the first QoS flow 606a and the second QoS flow 606b to a single DRB to be communicated via the F1-U interface, while the third QoS flow 606c is mapped to another DRB communicated via another F1-U interface. The CU-UP 504 may map an F1-U tunnel to an RLC channel or an RLC channel set so that a user plane protocol instance is instantiated per F1-U tunnel. Accordingly, the user plane protocol is agnostic to the constituent QoS flows carried in the F1-U tunnel.

Thus, the RAN portion (e.g., the CU 410 and the DU 430) of the user plane flow may perform its own QoS enforcement in a manner that is not exposed to the UPF 195 or core network.

In certain aspects, user plane protocol data (e.g., control information) is communicated via the GTP-U protocol. For example, as discussed above, a the CU 410 may append a GTP-U header containing control information to a user plane data packet to convey control information associated with the data packet to the DU 430. Thus, the data and control information may be communicated in parallel. In some examples, the DU 430 may strip the header from the packet before forwarding the packet to the UE 104. The header information may include a sequence number of the packet if the packet is part of a sequence of packets being communicated to the UE 104. The DU 430 may also transmit control information to the CU 410, such as downlink delivery status (e.g., whether the packet was successfully delivered to the UE 104 and/or radio conditions between the DU 430 and the UE 104).

However, future generations of wireless communications may be defined by a lower-layer split of the RAN portion based on other lower-layer splits of other standards bodies that have resulted in reduced signaling overhead. Consequently, such a split may require redistribution of functionality between the UPF 195 and the DU 430, such that one or more of the UPF 195 and the DU 430 include functional aspects of the CU-UP 504. Accordingly, aspects of the disclosure are directed to an architecture of such a user plane split.

Examples of a User Plane Split Architecture

Figure 7:
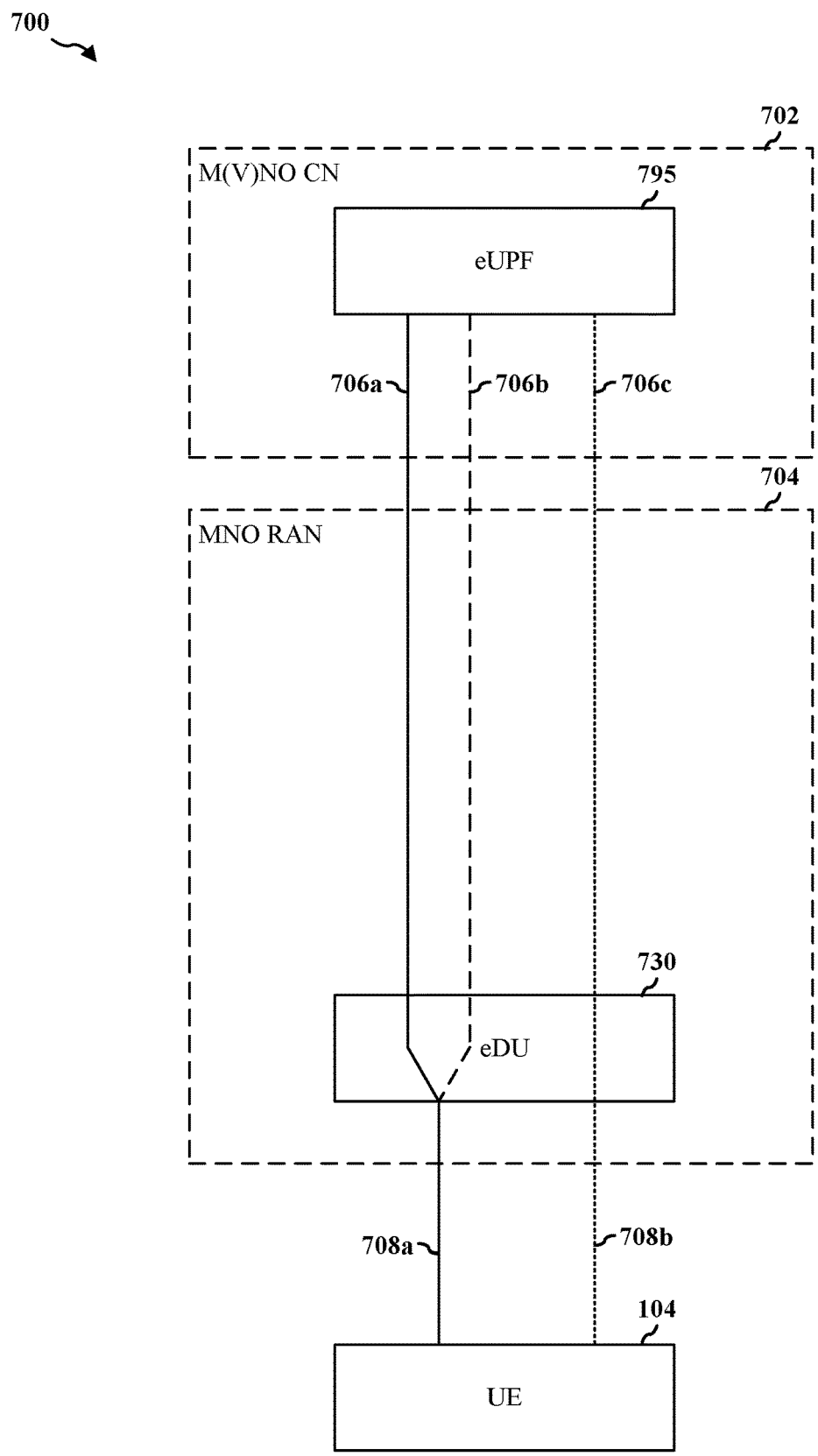
FIG. 7 is a block diagram illustrating an example of multiple user plane protocol instances in a split architecture.

FIG. 7 is a block diagram illustrating an example of multiple user plane protocol instances 700 in a split architecture. In contrast to the user plane communications illustrated in FIG. 6, the CU-UP is eliminated, however its functionality may be split between an eUPF 795 and an eDU 730. For example, the eUPF 795 and the eDU 730 may retain the same functionality as the UPF 195 and DU 430 described above in reference to FIG. 6, but may also include other functionality associated with the CU-UP 504 of FIG. 6. Thus, the eUPF 795 may receive data packets from a data network, then it may forward the packets to the eDU 730. The interface between the eUPF 795 and the eDU 730 may include a wireline connection and/or a wireless connection. The eDU 730 may then transmit the packets to the UE using RLC channels via an air interface.

Accordingly, the eDU 730 may need to be able to communicate with the eUPF 795 in order to regulate the amount of data traffic transmitted by the eUPF 795 to the eDU 730. This is because the interface between the eDU 730 and the eUPF 795 may be a wireline and/or wireless interface capable of a relatively large data transfer rate, while the air interface between the eDU 730 and the UE 104 may not support such a data rate. That is, the eDU 730 and eUPF 795 wireless/wireline interface may experience a link condition that is better than the link condition of the interface between the eDU 730 and the UE 104. Such a disparity in link conditions may be one reason for throttling a data rate of the eUPF 795. As such, there is a need for communication of user plane flow protocol (e.g., control information) between the eDU 730 and the eUPF 795. There is also a need to maintain QoS enforcement at the RAN 704 portion (e.g., eDU 730) of the user plane flow in a manner that is not exposed to the eUPF 795 or core network 702.

Thus, in certain aspects, the eDU 730 may determine whether and how to map QoS flows (e.g., a first QoS flow 706a, a second QoS flow 706b, and a third QoS flow 706c (collectively QoS flows 706)) of the eUPF 795 to same or different RLC channels. Moreover, the eDU 730 and the eUPF 795 may communicate control information with each other regarding corresponding QoS flows. In some examples, multiple QoS flows 706 may be communicated to the eDU 730 via an F1-U tunnel. Accordingly, the CUPF 795 may include a header configured to identify a corresponding QoS flow with packets transmitted via the corresponding QoS flow. As such, if the eUPF 795 transmits multiple QoS flows via the same tunnel, the eDU 730 may receive the packets of the QoS flows and identify which QoS flow is associated with each packet via the packet header. It should be noted that in some examples, the eUPF 795 may also include a header configured to identify a QoS flow associated with transmitted packets if the QoS flow is the only QoS flow transmitted via a tunnel.

In certain aspects, the eDU 730 may use the QoS flow information from a received header to determine a mapping between the QoS flow identified in the header and an RLC channel. For example, as illustrated, packets from the first QoS flow 706a and the second QoS flow may be received by the eDU 730 with headers identifying their corresponding QoS flows. Based on the QoS requirements associated with each flow, the cDU 730 may determine to strip the headers and transmit the packets via a single RLC channel (e.g., a first RLC channel 708a).

Figure 8:
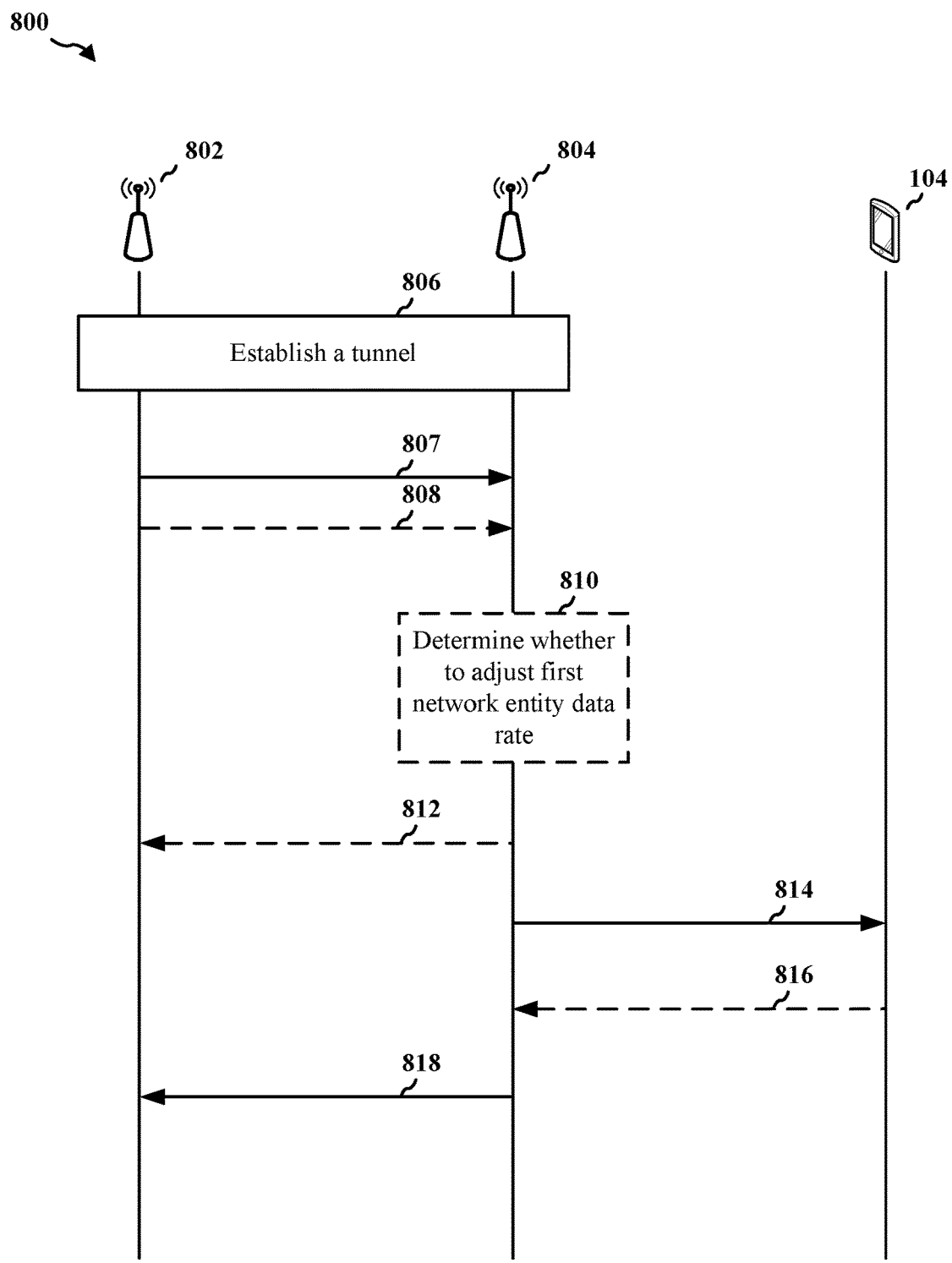
FIG. 8 is a call-flow diagram illustrating example communications between a first network entity and a second network entity.

FIG. 8 is a call-flow diagram illustrating example communications 800 between a first network entity 802 and a second network entity 804. The two network entities may correspond to the eUPF 795 and the eDU 730 respectively, of FIG. 7. Although it should be noted that any suitable network entity may be configured to execute the features described herein. For example, any suitable functional node of a core network and a RAN may be configured to perform the techniques described herein. In some examples, one of the first network entity 802 or the second network entity 804 is a base station and the other is a user plane function entity. In some examples, both of the first network entity 802 or the second network entity 804 are a base station or a user plane function entity. In some examples, the first network entity 802 and the second network entity 804 are functionally separate aspects of a base station.

At a first process 806, the first network entity 802 and the second network entity 804 may establish a tunnel for communication between the two entities. In certain aspects, the connection between the eDU 730 and the eUPF 795 may be defined as a tunnel established according to any suitable tunneling protocol (e.g., GTP-U). The tunnel may be established to facilitate communication between the first network entity 802 and the second network entity 804, wherein the first network entity 802 is hosting a peer user plane protocol session and the second network entity 804 is hosting a corresponding user plane protocol session. In other words, the first network entity 802 may host an application layer and the second network entity 804 may host the same application layer, wherein the application layer is associated with a UE 104 (e.g., the UE is running an application for which data is received via the user plane protocol session).

At a first communication 807, the first network entity 802 may transmit a user plane packet or user plane PDU to the second network entity 804, wherein the PDU is transmitted via the established tunnel and is intended to be received by the UE 104 via the second network entity 804. In some examples, the PDU is a first PDU of a sequence of multiple PDUs of a flow. The first network entity 802 may transmit each PDU of the PDU flow with a header identifying a particular flow of PDUs of which the first PDU is a part. In some examples, the flow identifier may be configured to identify a corresponding QoS flow and/or a type of QoS associated with the flow. Thus, the first PDU may include a header containing information indicating a type of QoS required by the first PDU.

In certain aspects, the header may contain additional control information to aid the second network entity 804. In some examples, the control information may include one or more of an identity of the tunnel used to transmit the first PDU and a sequence number identifying the first PDU within a sequential flow of PDUs. For example, the tunnel identity may include an indication of an IP address of the first network entity 802 and/or the second network entity 804. In another example, the sequence number may be configured to identify a position of the PDU within a sequential flow of PDUs. Here, the flow of PDUs may contain data for displaying a video at the UE 104, in which case, the PDUs may need to be transmitted to the UE 104 in an order directed by the sequence number associated with each of the PDUs.

In an optional second communication 808, the first network entity 802 may transmit a second PDU as part of another PDU flow using the same tunnel used for transmitting the first PDU. The second PDU may also include a header with control information indicative of the QoS type and/or its associated PDU flow.

In an optional second process 810, the second network entity 804 may determine, based on a rate at which it receives the first PDU and its corresponding flow of PDUs, whether to transmit control information to the first network entity 802 indicating a request for the first network entity 802 to throttle or increase the rate at which it transmits data to the second network entity 804. In some examples, the determination may also be based on a rate at which it receives the second PDU and its corresponding flow of PDUs. In some examples, the determination may also be based on one or more of a buffer size of the second network entity 804, or a link event (e.g., a link outage, a link resume, a radio link quality, etc.) between the second network entity 804 and the UE 104.

At an optional third communication 812, the second network entity 804 may transmit control information to the first network entity 802 indicating the link event, the buffer size, or any other suitable information indicating whether the transmission data rate from the first network entity 802 to the second network entity 804 should be increased or decreased. In some examples, the second network entity 804 may transmit an indication of a preferred buffer size of the second network entity. In another example, the second network entity 804 may transmit an indication of a preferred data rate at which the first network entity 802 transmits user plane PDUs of a PDU flow to the second network entity 804.

At a fourth communication 814, the second network entity 804 may strip the headers from one or more of the first PDU and/or the second PDU received from the first network entity 802 and transmit the first and/or second PDUs to the UE 104.

At an optional fifth communication 816, the UE may transmit an ACK/NACK message to the second network entity 804 indicating whether the UE 104 properly received the PDU(s) transmitted at the fourth communication 814.

At a sixth communication 818, the second network entity 804 may transmit a control message containing control information to the first network entity 802 indicating a transmission status of one or more of the first PDU and/or the second PDU, a transmission status of a sequence corresponding to one or more of the first PDU and/or the second PDU, and/or a transmission status of one or more of the PDU flows associated with the first PDU and/or the second PDU.

In some examples, the control message is configured to indicate the successful in-sequence delivery of a sequence of PDUs that include the first PDU. For example, the second network entity 804 may determine that the sequence of PDUs was successfully delivered to the UE 104 if the UE 104 transmits an ACK message (e.g., fifth communication 816) indicative of successful receipt of the sequence of PDUs. In another example, the control message is configured to indicate a successful delivery of one or more of the first and/or second PDU via retransmission to the UE 104. In another example, the control message is configured to indicate the successful transmission of one or more of the first PDU and/or the second to the lower layers (e.g., the UE 104). In this example, a successful transmission indicates that the second network entity successfully transmitted one or more of the first PDU although the second network entity 804 has not received an ACK/NACK response from the UE 104. In some examples, the indication of the successful transmission indicates that the first and/or second PDU were successfully transmitted to the UE 104 in-sequence with their respective PDU flows. In some examples, the indication of the successful transmission indicates that the first and/or second PDU were successfully re-transmitted to the UE 104.

In another example, the control message may be configured to indicate a failure to deliver one or more of the first PDU and/or second PDU to the UE 104. In yet another example, the control message may be configured to indicate a successful delivery or a successful transmission of one or more of the first PDU and/or the second PDU out of their respective sequences.

In some examples, the control message may include QoS monitoring information. Here, the first network entity 802 may include a transmission instance (e.g., a time when the PDU was transmitted to the second network entity 804) in the packet header of one or more of the first PDU and/or the second PDU. In such an example, the QoS monitoring information may include a time that one or more of the first PDU and/or the second PDU was received at the second network entity 804, or a delta indicative of an amount of time between the second network entity 804 receiving the PDU and transmitting the PDU. The first network entity 802 may use this information to determine whether the QoS requirements associated with one or more of the first PDU and/or the second PDU are being met.

In some examples, the control message may be prompted by a request from the first network entity 802. Here, the first network entity 802 may transmit a control message to the second network entity 804 requesting a transmission status of a particular PDU, PDU sequence, or PDU flow. In response, the second network entity 804 may transmit the transmission status to the first network entity 802. In some examples, the control message transmitted from the first network entity may be configured to request that the second network entity 804 discard one or more PDUs or blocks of PDU from the PDU flow (e.g., not transmit certain PDUs to the UE 104).

In some examples, the control message may include or more of the sequence number, the PDU flow identifier, or a QoS flow identifier to indicate to the first network entity 802 which PDUs or PDU flow/sequence the control information is directed to.

Figure 9:
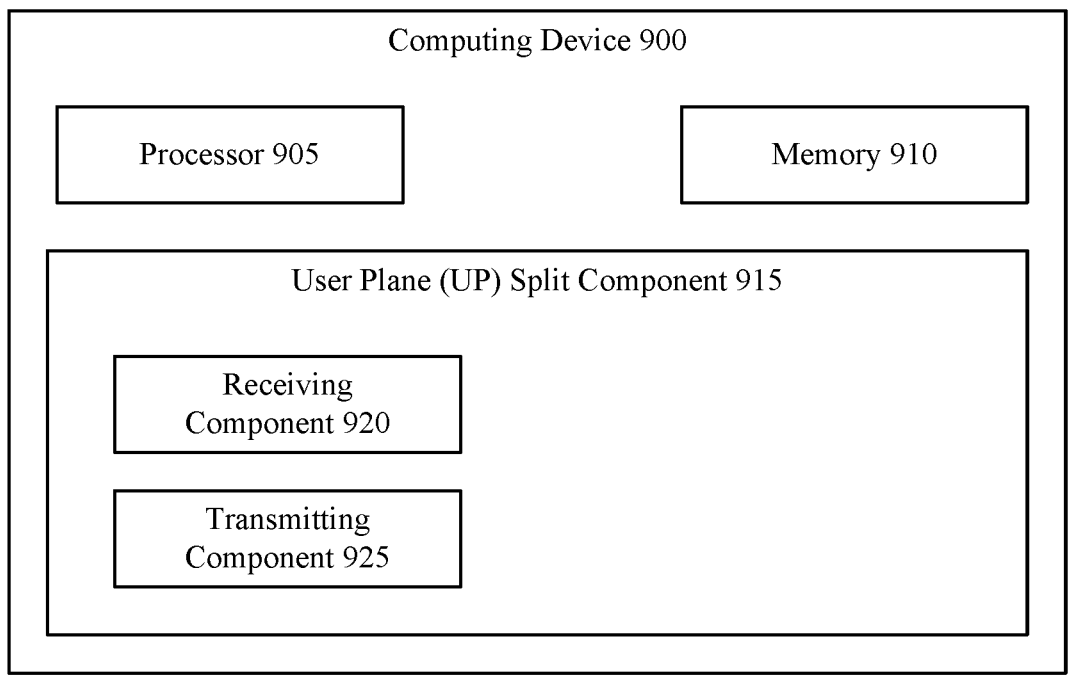
FIG. 9 is a block diagram of an example of a computer device having components configured to perform a method of wireless communication at a first network entity hosting a user plane (UP) protocol session.

Referring to FIG. 9 and FIG. 10, in operation, computing device 900 may perform a method 1000 of wireless communication at a first network entity hosting a user plane (UP) protocol session, such as via execution of UP split component 915 by processor 905 and/or memory 910.

At block 1002, the method 1000 includes receiving, from a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE). For example, in an aspect, computing device 900, processor 905, memory 910, UP split component 915, and/or receiving component 920 may be configured to or may comprise means for receiving, from a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE).

For example, the receiving at block 1002 may include receiving a user plane packet or user plane PDU transmitted from the second network entity, wherein the PDU is transmitted via a tunnel established between the first network entity and the second network entity as illustrated in the first communication 807 of FIG. 8. Further, for example, the receiving at block 1002 may be performed to support a split UP protocol session such that functionality of a CU-UP is split between the first network entity and the second network entity as illustrated in FIG. 7.

At block 1004, the method 1000 includes transmitting, to the second network entity within the UP-protocol session, a control message configured to indicate a status of transmission of the first data to the UE, wherein the control message comprises an indication of the second identifier. For example, in an aspect, computer device 900, processor 905, memory 910, UP split component 915, and/or transmitting component 925 may be configured to or may comprise means for transmitting, to the second network entity within the UP-protocol session, a control message configured to indicate a status of transmission of the first data to the UE, wherein the control message comprises an indication of the second identifier.

For example, the transmitting at block 1004 may include transmitting a control message to the second network entity to provide a status of data transmitted to the UE. For example, the status may be a successful delivery/transmission/re-transmission, etc., as illustrated by the sixth communication 818 of FIG. 8.

In an alternative or additional aspect, the second identifier is further configured to identify the first flow of UP-PDUs as a sequence of UP-PDUs. In an optional addition to this aspect, the second identifier is further configured to identify the type of QoS, and wherein the type of QoS is associated with the sequence of UP-PDUs. In another optional addition to this aspect, the status of transmission of the first data to the UE is configured to indicate whether in-sequence delivery of the sequence of UP-PDUs to the UE was successful, or whether in-sequence transmission of the sequence of UP-PDUs to the UE was successful. In another optional addition to this aspect, the status of transmission of the first data to the UE is configured to indicate whether out-of-sequence delivery of the sequence of UP-PDUs to the UE was successful, or whether out-of-sequence transmission of the sequence of UP-PDUs to the UE was successful. In an alternative or additional aspect, the third identifier is a first sequence number associated with the first UP-PDU, wherein at least one other UP-PDU of the first flow of UP-PDUs is associated with a second sequence number, and wherein the first UP-PDU and the at least one other UP-PDU form a sequence of UP-PDUs.

In an alternative or additional aspect, the control message further comprises an indication of the first identifier.

In an alternative or additional aspect, the first identifier comprises IP address information of one or more of the first network entity or the second network entity.

In an alternative or additional aspect, the tunnel is a general packet radio service (GPRS) tunneling protocol user plane (GTP-U) tunnel.

Figure 11:
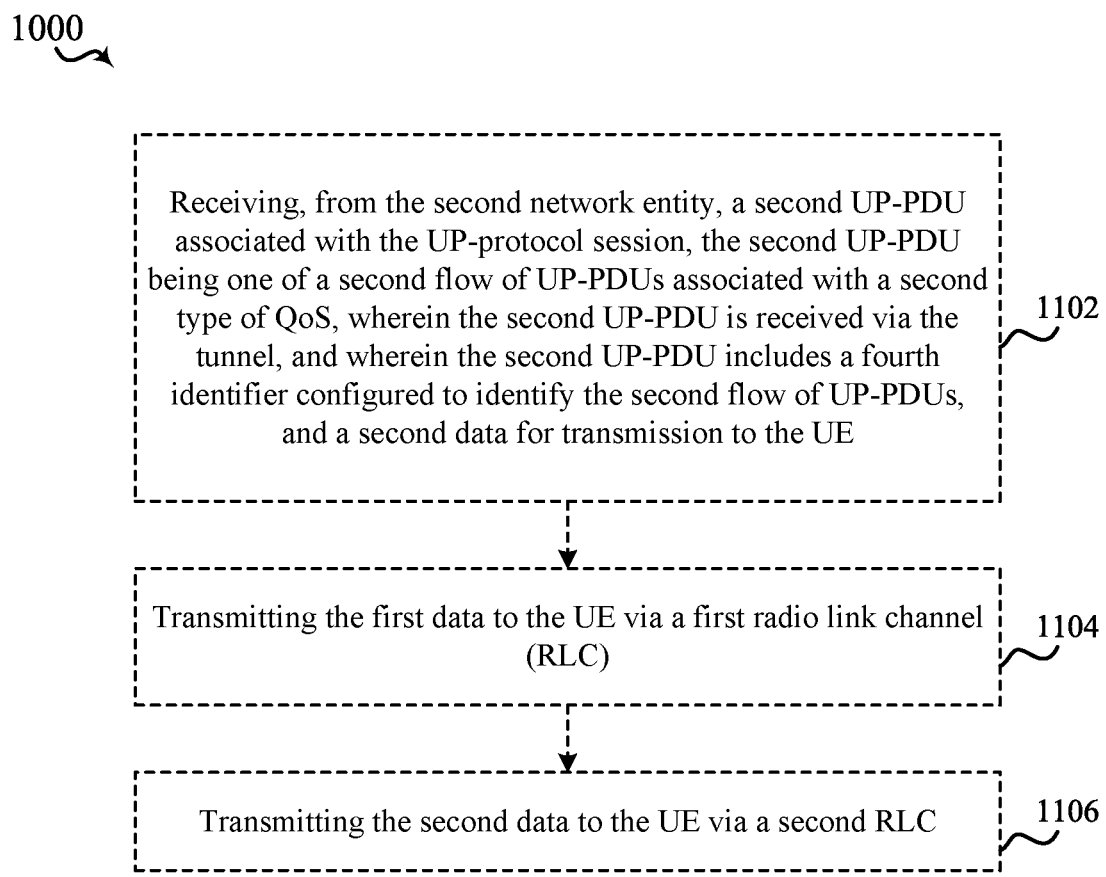
FIG. 11 is a flowchart of additional aspects of the method of FIG. 10.

Referring to FIG. 11, in an alternative or additional aspect, at block 1102, the method 1000 may further include receiving, from the second network entity, a second UP-PDU associated with the UP-protocol session, the second UP-PDU being one of a second flow of UP-PDUs associated with a second type of QoS, wherein the second UP-PDU is received via the tunnel, and wherein the second UP-PDU includes a fourth identifier configured to identify the second flow of UP-PDUs, and a second data for transmission to the UE. For example, in an aspect, computer device 900, processor 905, memory 910, UP split component 915, and/or receiving component 920 may be configured to or may comprise means for receiving, from the second network entity, a second UP-PDU associated with the UP-protocol session, the second UP-PDU being one of a second flow of UP-PDUs associated with a second type of QoS, wherein the second UP-PDU is received via the tunnel, and wherein the second UP-PDU includes a fourth identifier configured to identify the second flow of UP-PDUs, and a second data for transmission to the UE.

For example, the receiving at block 1102 may include receiving multiple packet flows that belong to the same UP-protocol session. For example, if a UE is executing a video chat application, the network may provide the UE with a video flow of packets in addition to an audio flow of packets. Thus, the first network entity may receive multiple packet flows corresponding to the same UP-protocol session. In some examples, each flow of packets may have a QoS requirement that is different from another flow of packets. Thus, to support a split UP-protocol session, the packets may include headers configured to identify a corresponding QoS flow indicative of a QoS requirement of a packet flow, as illustrated by the second communication 808 of FIG. 8.

In an alternative or additional aspect, the control message is further configured to indicate a status of transmission of the second data to the UE, and wherein the control message comprises an indication of the fourth identifier.

In this optional aspect, at block 1104, the method 1000 may further include transmitting the first data to the UE via a first radio link channel (RLC). For example, in an aspect, computer device 900, processor 905, memory 910, UP split component 915, and/or transmitting component 925 may be configured to or may comprise means for transmitting the first data to the UE via a first radio link channel (RLC).

For example, the transmitting at block 1104 may include stripping a header from a packet of data from a packet flow, and transmitting the packet of data without the header to the UE. In order to support a UP split protocol session, the header of each packet may include additional information for the first network entity, such as an identifier of a flow of packets that is associated with a QoS requirement or type for the packets in the identified flow, as illustrated by the fourth communication 814 of FIG. 8.

In this optional aspect, at block 1106, the method 1000 may further include transmitting the second data to the UE via a second RLC. For example, in an aspect, computer device 900, processor 905, memory 910, UP split component 915, and/or transmitting component 925 may be configured to or may comprise means for transmitting the second data to the UE via a second RLC.

For example, the transmitting at block 1106 may include transmitting different packet flows according to different RLC channels. Thus, while multiple packet flows may be transmitted to the first network entity via a same tunnel and same UP-protocol session, different types of QoS associated with each packet flow may require the first network entity to use different RLC channels to transmit a corresponding packet flow to the UE.

In an alternative or additional aspect, the control message is further configured to indicate an RLC event associated with one or more of the first RLC or the second RLC. In this aspect, the RLC event comprises one or more of a link outage, a link resume, or a link degradation of the corresponding first RLC or second RLC.

In an alternative or additional aspect, the control message is further configured to indicate a radio link quality associated with one or more of the first RLC or the second RLC.

In an alternative or additional aspect, the status of transmission of the first data comprises an indication of: whether the first data was successfully delivered to the UE, or whether the first data was successfully transmitted to the UE.

In an alternative or additional aspect, the status of transmission of the first data comprises an indication of: whether the first data was successfully re-transmitted to the UE.

In an alternative or additional aspect, the control message is further configured to indicate a buffer size preference of the first network entity, the buffer size preference indicative of a buffer size used by the first network entity for storing data from the first flow of UP-PDUs prior to transmitting the data to the second network entity.

In an alternative or additional aspect, the control message is further configured to indicate a data rate preference of the first network entity, the data rate preference indicative of a data rate used by the first network entity for transmitting data received from the first flow of UP-PDUs to the second network entity.

Figure 12:
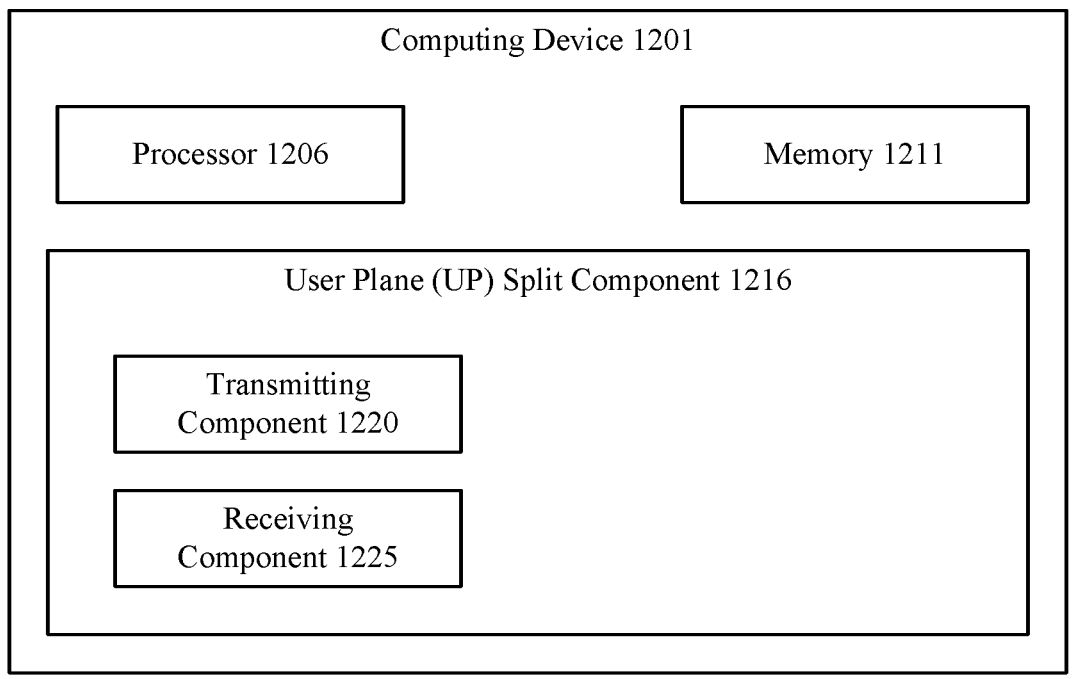
FIG. 12 is a block diagram of an example of a computer device having components configured to perform a method of wireless communication at a first network entity hosting a user plane (UP) protocol session.

Referring to FIG. 12 and FIG. 13, in operation, computing device 1201 may perform a method 1300 of wireless communication at a first network entity hosting a user plane (UP) protocol session, such as via execution of UP split component 1216 by processor 1206 and/or memory 1211.

At block 1302, the method 1300 includes transmitting, to a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE). For example, in an aspect, computer device

1201, processor 1206, memory 1211. UP split component 1216, and/or transmitting component 1220 may be configured to or may comprise means for transmitting, to a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE).

For example, the transmitting at block 1302 may include transmitting data packets to a second network entity, as illustrated in the first communication 807 of FIG. 8.

At block 1304, the method 1300 includes receiving, from the second network entity within the UP-protocol session, a control message configured to indicate a status of transmission of the first data to the UE, wherein the control message comprises an indication of the second identifier. For example, in an aspect, computer device 1201, processor 1206, memory 1211, UP split component 1216, and/or receiving component 1225 may be configured to or may comprise means for receiving, from the second network entity within the UP-protocol session, a control message configured to indicate a status of transmission of the first data to the UE, wherein the control message comprises an indication of the second identifier.

For example, the receiving at block 1304 may include receiving a control message indicating the status of transmission to the UE by the second network entity, as illustrated by the fourth communication 814 and the sixth communication 818 of FIG. 8.

In an alternative or additional aspect, the second identifier is further configured to identify the first flow of UP-PDUs as a sequence of UP-PDUs. In this aspect, the second identifier is further configured to identify the type of QoS, and wherein the type of QoS is associated with the sequence of UP-PDUs. In another alternative of this aspect, the status of transmission of the first data to the UE is configured to indicate whether in-sequence delivery of the sequence of UP-PDUs to the UE was successful, or whether in-sequence transmission of the sequence of UP-PDUs to the UE was successful. In another alternative of this aspect, the status of transmission of the first data to the UE is configured to indicate whether out-of-sequence delivery of the sequence of UP-PDUs to the UE was successful, or whether out-of-sequence transmission of the sequence of UP-PDUs to the UE was successful.

In an alternative or additional aspect, the third identifier is a first sequence number associated with the first UP-PDU, wherein at least one other UP-PDU of the first flow of UP-PDUs is associated with a second sequence number, and wherein the first UP-PDU and the at least one other UP-PDU form a sequence of UP-PDUs.

In an alternative or additional aspect, the control message further comprises an indication of the first identifier.

In an alternative or additional aspect, the first identifier comprises IP address information of one or more of the first network entity or the second network entity.

In an alternative or additional aspect, the tunnel is a general packet radio service (GPRS) tunneling protocol user plane (GTP-U) tunnel.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

ADDITIONAL CONSIDERATIONS

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X. Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X. Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X. Y, and Z. Alternatively, a single processor may execute the instructions stored on a single memory, or distributed across multiple memories, to accomplish performing actions X, Y, and Z.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B. A and C. B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method of wireless communication at a first network entity hosting a user plane (UP) protocol session, the method comprising: receiving, from a second network entity, a first user plane protocol data unit (UP-PDU) associated with the UP-protocol session, the first UP-PDU being one of a first flow of UP-PDUs associated with a first type of quality of service (Qos), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE); and transmitting, to the second network entity within the UP-protocol session, a control message configured to indicate a status of transmission of the first data to the UE, wherein the control message comprises an indication of the second identifier.

Example 2 is the method of example 1, wherein the second identifier is further configured to identify the first flow of UP-PDUs as a sequence of UP-PDUs.

Example 3 is the method of example 2, wherein the second identifier is further configured to identify the type of QoS, and wherein the type of QoS is associated with the sequence of UP-PDUs.

Example 4 is the method of any of examples 2 and 3, wherein the status of transmission of the first data to the UE is configured to indicate whether in-sequence delivery of the sequence of UP-PDUs to the UE was successful, or whether in-sequence transmission of the sequence of UP-PDUs to the UE was successful.

Example 5 is the method of any of examples 2-4, wherein the status of transmission of the first data to the UE is configured to indicate whether out-of-sequence delivery of the sequence of UP-PDUs to the UE was successful, or whether out-of-sequence transmission of the sequence of UP-PDUs to the UE was successful.

Example 6 is the method of any of examples 1-5, wherein the third identifier is a first sequence number associated with the first UP-PDU, wherein at least one other UP-PDU of the first flow of UP-PDUs is associated with a second sequence number, and wherein the first UP-PDU and the at least one other UP-PDU form a sequence of UP-PDUs.

Example 7 is the method of any of examples 1-6, wherein the control message further comprises an indication of the first identifier.

Example 8 is the method of any of examples 1-7, wherein the first identifier comprises IP address information of one or more of the first network entity or the second network entity.

Example 9 is the method of any of examples 1-8, wherein the tunnel is a general packet radio service (GPRS) tunneling protocol user plane (GTP-U) tunnel.

Example 10 is the method of any of examples 1-9, further comprising: receiving, from the second network entity, a second UP-PDU associated with the UP-protocol session, the second UP-PDU being one of a second flow of UP-PDUs associated with a second type of QoS, wherein the second UP-PDU is received via the tunnel, and wherein the second UP-PDU includes a fourth identifier configured to identify the second flow of UP-PDUs, and a second data for transmission to the UE.

Example 11 is the method of example 10, wherein the control message is further configured to indicate a status of transmission of the second data to the UE, and wherein the control message comprises an indication of the fourth identifier.

Example 12 is the method of any of examples 10 and 11, further comprising: transmitting the first data to the UE via a first radio link channel (RLC); and transmitting the second data to the UE via a second RLC.

Example 13 is the method of example 12, wherein the control message is further configured to indicate an RLC event associated with one or more of the first RLC or the second RLC.

Example 14 is the method of example 13, wherein the RLC event comprises one or more of a link outage, a link resume, or a link degradation of the corresponding first RLC or second RLC.

Example 15 is the method of any of examples 12-14, wherein the control message is further configured to indicate a radio link quality associated with one or more of the first RLC or the second RLC.

Example 16 is the method of any of examples 1-15, wherein the status of transmission of the first data comprises an indication of: whether the first data was successfully delivered to the UE, or whether the first data was successfully transmitted to the UE.

Example 17 is the method of any of examples 1-16, wherein the status of transmission of the first data comprises an indication of: whether the first data was successfully re-transmitted to the UE.

Example 18 is the method of any of examples 1-17, wherein the control message is further configured to indicate a buffer size preference of the first network entity, the buffer size preference indicative of a buffer size used by the first network entity for storing data from the first flow of UP-PDUs prior to transmitting the data to the second network entity.

Example 19 is the method of any of examples 1-18, wherein the control message is further configured to indicate a data rate preference of the first network entity, the data rate preference indicative of a data rate used by the first network entity for transmitting data received from the first flow of UP-PDUs to the second network entity.

Example 20 is a method of wireless communication at a first network entity hosting a user plane (UP) protocol session, the method comprising: transmitting, to a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE); and receiving, from the second network entity within the UP-protocol session, a control message configured to indicate a status of transmission of the first data to the UE, wherein the control message comprises an indication of the second identifier.

Example 21 is the method of example 20, wherein the second identifier is further configured to identify the first flow of UP-PDUs as a sequence of UP-PDUs.

Example 22 is the method of example 21, wherein the second identifier is further configured to identify the type of QoS, and wherein the type of QoS is associated with the sequence of UP-PDUs.

Example 23 is the method of any of examples 21 and 22, wherein the status of transmission of the first data to the UE is configured to indicate whether in-sequence delivery of the sequence of UP-PDUs to the UE was successful, or whether in-sequence transmission of the sequence of UP-PDUs to the UE was successful.

Example 24 is the method of any of examples 21-23, wherein the status of transmission of the first data to the UE is configured to indicate whether out-of-sequence delivery of the sequence of UP-PDUs to the UE was successful, or whether out-of-sequence transmission of the sequence of UP-PDUs to the UE was successful.

Example 25 is the method of any of examples 20-24, wherein the third identifier is a first sequence number associated with the first UP-PDU, wherein at least one other UP-PDU of the first flow of UP-PDUs is associated with a second sequence number, and wherein the first UP-PDU and the at least one other UP-PDU form a sequence of UP-PDUs.

Example 26 is the method of any of examples 20-25, wherein the control message further comprises an indication of the first identifier.

Example 27 is the method of any of examples 20-26, wherein the first identifier comprises IP address information of one or more of the first network entity or the second network entity.

Example 28 is the method of any of examples 20-27, wherein the tunnel is a general packet radio service (GPRS) tunneling protocol user plane (GTP-U) tunnel.

Example 29 is a first network entity comprising: one or more memories, individually or in combination, having instructions; and one or more processors, individually or in combination, configured to execute the instructions and cause the first network entity to perform the method of any of claims 1-19.

Example 30 is a first network entity comprising: one or more memories, individually or in combination, having instructions; and one or more processors, individually or in combination, configured to execute the instructions and cause the first network entity to perform the method of any of claims 20-28.

Example 31 is a first network entity comprising: one or more means for performing the method of any of claims 1-19.

Example 32 is a first network entity comprising: one or more means for performing the method of any of claims 20-28.

Example 33 is a non-transitory computer-readable storage medium having instructions stored thereon for performing the method of any of claims 1-19 for wireless communication by a first network entity.

Example 34 is a non-transitory computer-readable storage medium having instructions stored thereon for performing the method of any of claims 20-28 for wireless communication by a first network entity.

What is claimed is:

1. A first network entity configured for wireless communication and hosting a user plane (UP) protocol session, the first network entity comprising:
one or more memories, individually or in combination, having instructions; and
one or more processors, individually or in combination, configured to execute the instructions and cause the first network entity to:
receive, from a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE); and
transmit, to the second network entity within the UP-protocol session, a control message configured to indicate a status of transmission of the first data to the UE, wherein the control message comprises an indication of the second identifier.

2. The first network entity of claim 1, wherein the second identifier is further configured to identify the first flow of UP-PDUs as a sequence of UP-PDUs.

3. The first network entity of claim 2, wherein the second identifier is further configured to identify the type of QoS, and wherein the type of QoS is associated with the sequence of UP-PDUs.

4. The first network entity of claim 2, wherein the status of transmission of the first data to the UE is configured to indicate whether in-sequence delivery of the sequence of UP-PDUs to the UE was successful, or whether in-sequence transmission of the sequence of UP-PDUs to the UE was successful.

5. The first network entity of claim 2, wherein the status of transmission of the first data to the UE is configured to indicate whether out-of-sequence delivery of the sequence of UP-PDUs to the UE was successful, or whether out-of-sequence transmission of the sequence of UP-PDUs to the UE was successful.

6. The first network entity of claim 1, wherein the third identifier is a first sequence number associated with the first UP-PDU, wherein at least one other UP-PDU of the first flow of UP-PDUs is associated with a second sequence number, and wherein the first UP-PDU and the at least one other UP-PDU form a sequence of UP-PDUs.

7. The first network entity of claim 1, wherein the control message further comprises an indication of the first identifier.

8. The first network entity of claim 1, wherein the first identifier comprises IP address information of one or more of the first network entity or the second network entity.

9. The first network entity of claim 1, wherein the tunnel is a general packet radio service (GPRS) tunneling protocol user plane (GTP-U) tunnel.

10. The first network entity of claim 1, wherein the one or more processors are further configured to:
receive, from the second network entity, a second UP-PDU associated with the UP-protocol session, the second UP-PDU being one of a second flow of UP-PDUs associated with a second type of QoS, wherein the second UP-PDU is received via the tunnel, and wherein the second UP-PDU includes a fourth identifier configured to identify the second flow of UP-PDUs, and a second data for transmission to the UE.

11. The first network entity of claim 10, wherein the control message is further configured to indicate a status of transmission of the second data to the UE, and wherein the control message comprises an indication of the fourth identifier.

12. The first network entity of claim 10, wherein the one or more processors are further configured to:
transmit the first data to the UE via a first radio link channel (RLC); and
transmit the second data to the UE via a second RLC.

13. The first network entity of claim 12, wherein the control message is further configured to indicate an RLC event associated with one or more of the first RLC or the second RLC.

14. The first network entity of claim 13, wherein the RLC event comprises one or more of a link outage, a link resume, or a link degradation of the corresponding first RLC or second RLC.

15. The first network entity of claim 12, wherein the control message is further configured to indicate a radio link quality associated with one or more of the first RLC or the second RLC.

16. The first network entity of claim 1, wherein the status of transmission of the first data comprises an indication of: whether the first data was successfully delivered to the UE, or whether the first data was successfully transmitted to the UE.

17. The first network entity of claim 1, wherein the status of transmission of the first data comprises an indication of: whether the first data was successfully re-transmitted to the UE.

18. The first network entity of claim 1, wherein the control message is further configured to indicate a buffer size preference of the first network entity, the buffer size preference indicative of a buffer size used by the first network entity for storing data from the first flow of UP-PDUs prior to transmitting the data to the second network entity.

19. The first network entity of claim 1, wherein the control message is further configured to indicate a data rate preference of the first network entity, the data rate preference indicative of a data rate used by the first network entity for transmitting data received from the first flow of UP-PDUs to the second network entity.

20. A first network entity configured for wireless communication and hosting a user plane (UP) protocol session, the first network entity comprising:
one or more memories, individually or in combination, having instructions; and
one or more processors, individually or in combination, configured to execute the instructions and cause the first network entity to:
transmit, to a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE); and receive, from the second network entity within the UP-protocol session, a control message configured to indicate a status of transmission of the first data to the UE, wherein the control message comprises an indication of the second identifier.

21. The first network entity of claim 20, wherein the second identifier is further configured to identify the first flow of UP-PDUs as a sequence of UP-PDUs.

22. The first network entity of claim 21, wherein the second identifier is further configured to identify the type of QoS, and wherein the type of QoS is associated with the sequence of UP-PDUs.

23. The first network entity of claim 21, wherein the status of transmission of the first data to the UE is configured to indicate whether in-sequence delivery of the sequence of UP-PDUs to the UE was successful, or whether in-sequence transmission of the sequence of UP-PDUs to the UE was successful.

24. The first network entity of claim 21, wherein the status of transmission of the first data to the UE is configured to indicate whether out-of-sequence delivery of the sequence of UP-PDUs to the UE was successful, or whether out-of-sequence transmission of the sequence of UP-PDUs to the UE was successful.

25. The first network entity of claim 20, wherein the third identifier is a first sequence number associated with the first UP-PDU, wherein at least one other UP-PDU of the first flow of UP-PDUs is associated with a second sequence number, and wherein the first UP-PDU and the at least one other UP-PDU form a sequence of UP-PDUs.

26. The first network entity of claim 20, wherein the control message further comprises an indication of the first identifier.

27. The first network entity of claim 20, wherein the first identifier comprises IP address information of one or more of the first network entity or the second network entity.

28. The first network entity of claim 20, wherein the tunnel is a general packet radio service (GPRS) tunneling protocol user plane (GTP-U) tunnel.

29. A method of wireless communication at a first network entity hosting a user plane (UP) protocol session, the method comprising:

receiving, from a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE); and transmitting, to the second network entity within the UP-protocol session, a control message configured to indicate a status of transmission of the first data to the UE, wherein the control message comprises an indication of the second identifier.

30. A method of wireless communication at a first network entity hosting a user plane (UP) protocol session, the method comprising:

transmitting, to a second network entity, a first user plane protocol data unit (UP-PDU) associated with the UP-protocol session, the first UP-PDU being one of a first flow of UP-PDUs associated with a first type of quality of service (QOS), wherein the first UP-PDU is received via a tunnel established between the first network entity and the second network entity, and wherein the first UP-PDU includes a first identifier configured to identify the tunnel, a second identifier configured to identify the first flow of UP-PDUs, a third identifier configured to identify the first UP-PDU within the first flow of UP-PDUs, and a first data for transmission to a user equipment (UE); and receiving, from the second network entity within the UP-protocol session, a control message configured to indicate a status of transmission of the first data to the UE, wherein the control message comprises an indication of the second identifier.

\* \* \* \* \*